United States
Vogel

4,172,662
Oct. 30, 1979

[54] EYEPIECE FOR MEASUREMENT OF LENGTHS AND ANGLES BY A MICROSCOPE

[75] Inventor: Albrecht Vogel, Oberkochen, Fed. Rep. of Germany

[73] Assignee: Carl Zeiss Stiftung, Oberkochen, Fed. Rep. of Germany

[21] Appl. No.: 830,460

[22] Filed: Sep. 6, 1977

[30] Foreign Application Priority Data

Sep. 8, 1976 [DE] Fed. Rep. of Germany ....... 2640284

[51] Int. Cl.² .............................................. G01C 9/10
[52] U.S. Cl. .................................... 356/248; 350/10; 350/175 E; 356/148; 356/397
[58] Field of Search ............... 356/143, 148, 248, 249, 356/397; 350/10, 175 E; 33/283, 297, 298, 343, 365

[56] References Cited

U.S. PATENT DOCUMENTS

| | | | |
|---|---|---|---|
| 559,090 | 4/1896 | West | 33/365 |
| 2,067,474 | 1/1937 | Carbonara | 33/365 |

FOREIGN PATENT DOCUMENTS 13320 of 1912 United Kingdom ..................... 356/248

*Primary Examiner*—John K. Corbin
*Assistant Examiner*—Matthew W. Koren
*Attorney, Agent, or Firm*—Stonebraker, Shepard & Stephens

[57] ABSTRACT

An eyepiece for use on a microscope when lengths and angles are to be measured. Two glass plates extending perpendicular to the optical axis of the eyepiece are spaced axially from each other to form between them a chamber containing a steel ball which is free to move, by gravity, to the lowest part of this chamber and which thus forms an artificial horizon. One of the glass plates, preferably the one farthest from the eye of the observer, is formed as a reticle, graduated with a diametrically extending linear scale and also with a circumferential series of radially extending angular graduations, read in conjunction with the steel ball to make the desired angular measurements.

7 Claims, 2 Drawing Figures

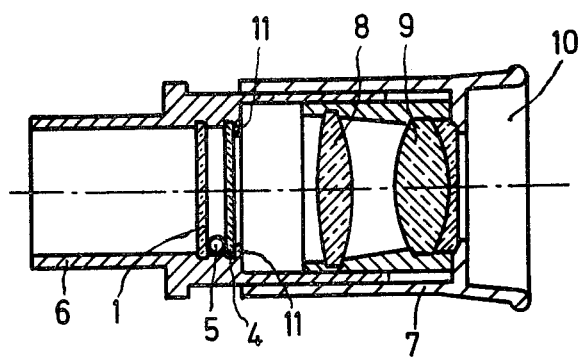
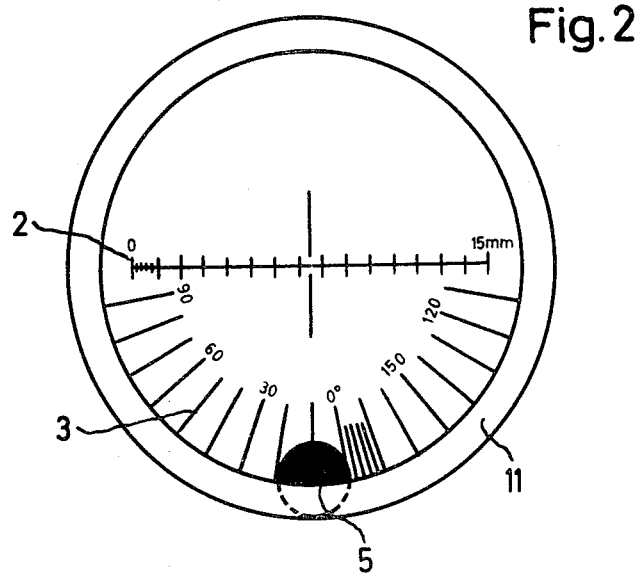

EYEPIECE FOR MEASUREMENT OF LENGTHS AND ANGLES BY A MICROSCOPE

BACKGROUND OF THE INVENTION

The present invention relates to a microscope eyepiece or ocular, especially designed to facilitate the use of the microscope in measuring lengths and angles.

Length and angle measurements by means of a microscope are made, for example, upon the matching or toric contact lenses. In modern soft contact lenses, the correction of astigmatism is accomplished by a toric outer surface whose axis must be in a definite predetermined relationship to what is called the DS axis. This DS axis extends through the two thickest edge points of the lens and the optical geometric center point of the contact lens. The inclination of the axis passing through the toric surface with respect to the DS axis is determined by the matching process.

It is known in the art to measure the inclination of the principal axes of a contact lens by means of a slit lamp. For doing this, a pointer is arranged on the outer side of a measuring eyepiece, in such position that it represents a continuation of the datum line of the eyepiece. Using this pointer, the inclination of the axis on the contact lens can be measured with reference to a graduated scale on a plate which is rigidly connected with the slit lamp, according to what is called the TABO system.

This known system of inclination measurement or angular measurement leaves much to be desired with respect to the precision or accuracy which is attainable. Furthermore, it is fatiguing and time-consuming for the lens matcher, since his direction of view must be continuously changed. Nevertheless, the use of the TABO system for angle measurements has gained general acceptance in the field since its introduction by the technical committee known as the "Technischen Ausschuss für Brillen-Optik," from the initial letters of which the designation TABO is derived. According to this system, reading is effected from the right in counterclockwise direction for both eyes.

An object of the present invention is to provide a device to enable angle measurements to be obtained more conveniently and with greater accuracy than is possible with the prior art devices.

Another object is the provision of such a device in a simple, compact, and inexpensive form.

SUMMARY OF THE INVENTION

The above objects are achieved, according to the invention, by providing a novel eyepiece or ocular for use with a conventional known form of slit-lamp microscope, the novel eyepiece including a plug-in extension equipped with a gravity ball for providing an artificial horizon, and with a reticle having a diametrically extending linear graduated scale, and an angle scale with the graduations extending radially in a circumferential series. The plug-in extension is adjustable axially for diopter compensation for the eye of the user. For determination of the angle of inclination of the axes essential for matching on a contact lens, the eyepiece is turned in the barrel tube of the slit lamp until the linear scale of the reticle extends in the direction of the axis to be determined on the contact lens. On the right hand side of the gravity ball, the angle of inclination of the axis can then be read on the angle scale. For ophthalmological measurements, the angle scale is preferably subdivided according to the TABO system.

BRIEF DESCRIPTION OF THE DRAWINGS

FIG. 1 is a longitudinal section through an eyepiece in accordance with a preferred embodiment of the invention; and FIG. 2 is an illustration of the field of view as seen through the eyepiece.

DESCRIPTION OF THE PREFERRED EMBODIMENT

Referring now to the drawings, the eyepiece of the present invention comprises the main housing 7 containing the usual conventional eyepiece lens members 8 and 9, and having an eyecup 10 against which the eye of the user may be placed.

A supplementary or extension housing 6 is telescopically connected to the main housing 7 so that they can be moved axially relative to each other. In this extension housing 6 there is a reticle 1, preferably in the form of a glass plate extending perpendicular to the optical axis of the eyepiece, and marked or graduated with a length scale and an angle scale. The length scale extends diametrically across the reticle, as shown at 2 in FIG. 2, and is subdivided in intervals of 0.2 mm. The angle scale extends circumferentially around approximately the lower half of the circumference of the reticle, the individual graduation lines extending radially with respect to the circular reticle, as indicated at 3 in FIG. 2. This angle scale is preferably subdivided in intervals of 2 degrees.

Spaced axially from the reticle plate 1 is a second glass plate 4, parallel to it and likewise perpendicular to the optical axis. These two plates form the front and back walls of a chamber which contains a steel ball 5, free to roll on the smooth circular periphery of the chamber so as to place itself, by gravity, at the lowest point of the chamber. Thus the ball forms an "artificial horizon" reference point. The two glass plates 1 and 4 are just far enough apart to allow free rolling movement of the steel ball, without unnecessary play. Instead of a steel sphere, the gravity ball may consist of a drop of mercury.

The extension tube 6 also contains a diaphragm 11 which limits the field of view, preferably to the extent of obscuring the lower half of the ball 5, as illustrated in FIG. 2. The extension tube 6 may be rotated relative to the main eyepiece tube 7, as well as be moved axially to obtain exact focus on the reticle and ball.

In the use of the present invention, the eyepiece is applied to the conventional slit lamp microscope device. When it is desired to determine the angle of inclination of the axes of the lens, either the entire eyepiece or at least the extension tube 6 carrying the reticle is rotated until the diametrical linear scale 2 extends in the direction of the axis to be determined, and the angle thereof is then read off of the angular scale 3, using the right hand edge of the ball 5 as the reference point or reading point for reading the angular scale. It will be noted from FIG. 2 that the angular scale is offset or displaced in a counterclockwise direction by an amount equal to the central angle subtended by half the diameter of the ball 5, so that the right hand edge of the ball can be used as the reference point for reading the scale directly without the need for any further calculation or compensation because not reading from the center of the ball.

The accuracy of the angle measurement is determined by the precision of the position assumed by the artificial horizon ball at the end of the turning movement of the reticle when a measurement is being taken. This precision of position, in turn, depends on the value of the static friction of the ball on the material adjoining it. With rolling friction of a steel ball on glass, a precision of reading of the angle of inclination within a tolerance of one-half a degree can be obtained.

One advantage of the present invention is that with a brief time of measurement, and with a simple device, and using a very simple and uncomplicated method of measurement, a high degree of accuracy or precision is obtained. Another advantage is that existing slit-lamp microscopes may be easily used for the matching of contact lenses, without any great expense, simply by using the eyepiece of the present invention with the existing microscope.

What is claimed is:

1. An eyepiece for angle measurements by a microscope, said eyepiece comprising housing means including a main housing (7) containing eyepiece lens means (8, 9) and an extension housing (6) telescopically connected to the main housing, a gravity ball within said extension housing to provide an artificial horizon observable by a person looking into said eyepiece, and a reticle also within said extension housing, said reticle having both a diametrically extending linear scale and a circumferentially extending angular scale, said angular scale being so placed with relation to said gravity ball that said angular scale may be read using one lateral edge of said gravity ball as a reference point.

2. A construction as defined in claim 1, wherein said reticle forms one wall of a chamber confining said gravity ball, further comprising a glass plate substantially parallel to and spaced from said reticle and forming another wall of said ball-confining chamber.

3. A construction as defined in claim 1, wherein said eyepiece has an optical axis, further comprising two glass plates within said extension housing extending perpendicular to said optical axis and spaced from each other in the direction of said optical axis to form between them a chamber, said gravity ball being a sphere located in said chamber.

4. A construction as defined in claim 3, wherein said chamber has a circumferential peripheral wall of smooth circular cylindrical shape on which said gravity ball may roll smoothly when said housing means is rotated about said optical axis, and wherein the axial spacing of said two glass plates from each other is only slightly greater than the diameter of said sphere located between said plates.

5. A construction in claim 4, wherein said gravity ball is of steel.

6. A construction as defined in claim 4, wherein said gravity ball consists of a drop of mercury.

7. A construction as defined in claim 3, wherein one of said glass plates is a reticle having a diametrical marking thereon and also having an angular scale arranged circumferentially thereon and positioned to be read with reference to one edge of said gravity ball.

* * * * *